Aug. 1, 1939.  C. B. MOORE  2,168,038
MEASURING APPARATUS
Filed June 1, 1936  2 Sheets-Sheet 1

INVENTOR.
COLEMAN B. MOORE
BY George M. Muschamp
ATTORNEY

Aug. 1, 1939.  C. B. MOORE  2,168,038
MEASURING APPARATUS
Filed June 1, 1936  2 Sheets-Sheet 2

INVENTOR.
COLEMAN B. MOORE
BY *George M. Munschamp*
ATTORNEY

Patented Aug. 1, 1939

2,168,038

UNITED STATES PATENT OFFICE 2,168,038

MEASURING APPARATUS

Coleman B. Moore, Carroll Park, Pa., assignor to The Brown Instrument Company, Philadelphia, Pa., a corporation of Pennsylvania Application June 1, 1936, Serial No. 82,852

9 Claims. (Cl. 73—151)

The general object of the present invention is to provide an improved measuring instrument of the type including a movable measuring member, and means for moving it in accordance with the variable value of some quantity or condition measured, by subjecting the member to a moving force large enough to move the member and to adjust the flapper valve of a pneumatic relay mechanism, but too small to effect recording control, or other functions which may be desirably performed by such an instrument.

While the general features of the present invention are adapted for other uses, the invention was primarily devised for use in a flow meter instrument including integrating and recording means, and of the type in which the instrument includes an inductance bridge receiver element connected by electrical conductors to the transmitter element of said bridge, said transmitter element being external to the instrument and associated with the manometer of a flow meter in a known manner. In such an arrangement, variations in the fluid flow rate measured, act through the manometer, to give movements to the movable magnetic core or armature of the transmitter, and such movements produce, by electro-magnetic action, corresponding movements of the movable core or armature of the receiver element of the bridge, the last mentioned armature forming the movable measuring member of the instrument proper.

In the preferred flow meter embodiment of the invention illustrated by way of example herein, the armature member of the receiver mechanism actuates the flapper control valve of mechanism, enclosed in the instrument casing, and comprising an air compressor supplying air under a variable pressure controlled by the flapper valve, for operating a pneumatic relay mechanism employed to adjust the recording pen arm of the instrument in accordance with variations in the rate of flow measured, and to operate mechanism, included in the instrument, for exhibiting the integrated value of the flow. The compressor is driven by an electric motor, which is also enclosed in the instrument casing, and also serves to give its timed movement to a record chart on which a record is made by the pen arm.

The various features of novelty which characterize my invention are pointed out with particularity in the claims annexed to, and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
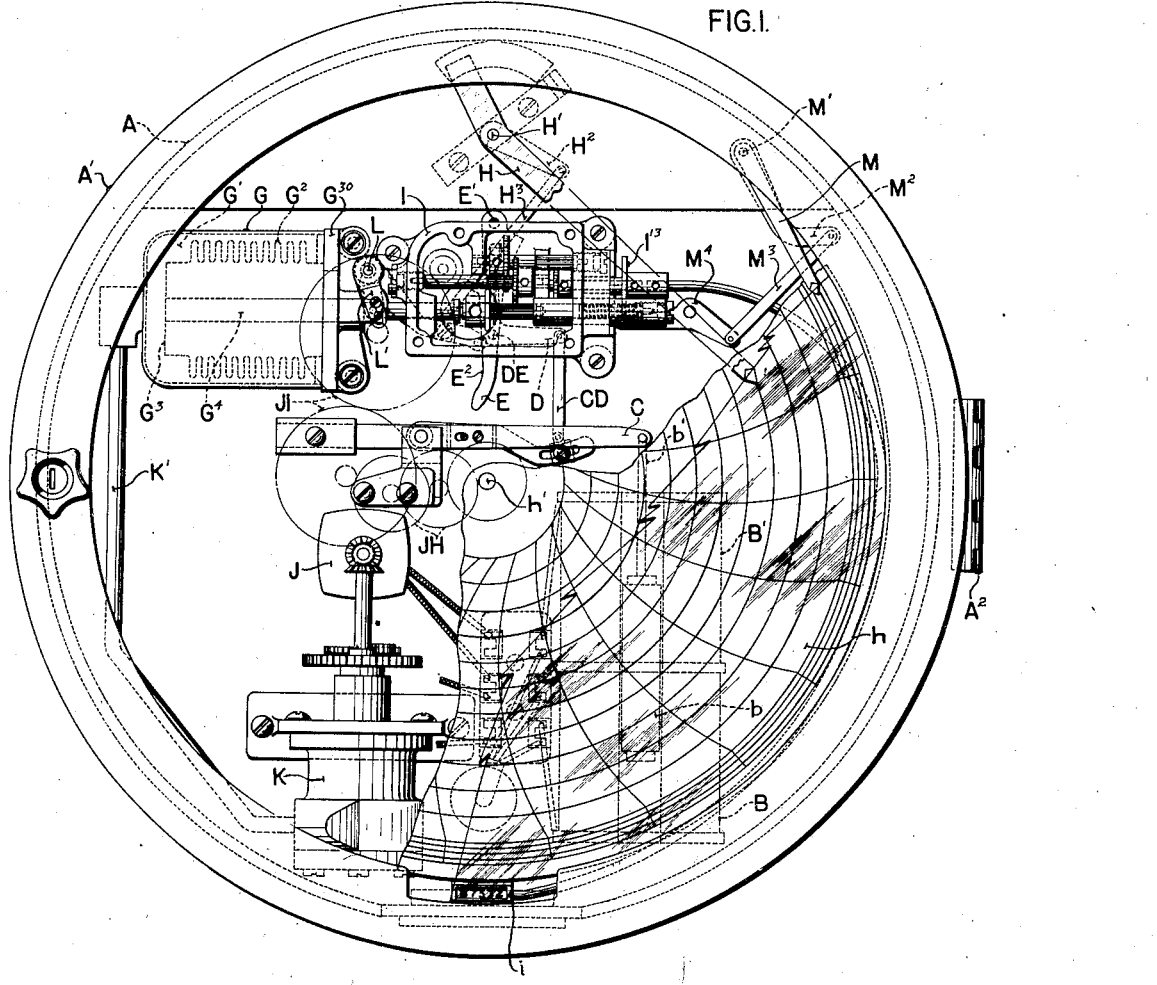
Fig. 1 is a front elevation of a flow integrating and recording instrument.

The instrument shown in the drawings is of the circular chart type, the instrument mechanism being enclosed in a casing or housing, which may be in the form of a short cylinder A provided with a front door A' connected to the casing body by a hinge A². The mechanism within the instrument includes an inductance bridge receiver element, comprising vertically disposed coils B and B', arranged end to end, and an armature $b$ axially movable in the coils B and B'. The receiving element of the instrument may be similar in type and in its inductance bridge association with the manometer actuated transmitter element of the bridge, with the arrangement disclosed in the Harrison Patent 1,743,852, granted January 14, 1930, and hence need not be illustrated or described herein.

Figure 3:
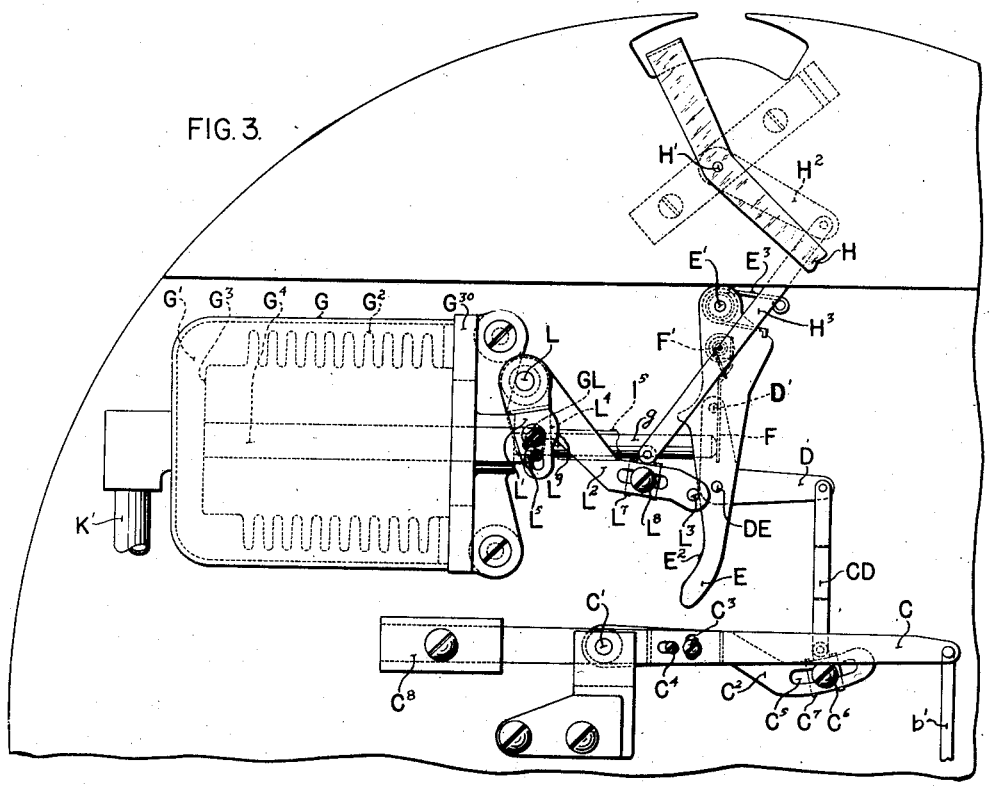
Fig. 3 is an elevation taken similarly to Fig. 1 but on a larger scale, of portions of the mechanism shown in Fig. 1.

In the construction shown, the armature $b$ is suspended from a lever C, to which the upper end of a stem or link extension $b'$ from the armature $b$ is pivotally connected. The angular movements imparted to the lever C by the armature $b$, are transmitted through a link CD to a lever D. The latter is pivoted on a lever E which is journalled on a supporting pivot E'. The angular movements of the levers D and E, effected as hereinafter described, control the adjustment of a flapper valve F, (Fig. 3), which regulates the discharge of air through the discharge or bleeder outlet nozzle $g$, from the pressure chamber G' of a bellows unit or fluid pressure device G, and thereby regulates the pressure in the chamber G' and the operative effect of the device G. As hereinafter described, the device G adjusts a recording pen arm H and controls the action of integrating mechanism I. The latter is actuated through suitable gearing by an electric motor J, which serves an additional timing function, in that through speed reducing gears JH, it rotates the driving element $h'$ which rotates the chart disc $h$ on which the pen arm H makes a record. The motor J also drives an air compressor K which is located in the instrument casing, and supplies air under pressure to the pressure chamber G' of the device G through a pipe K'. Air is bled or vented from the chamber G' through the nozzle $g$, at a rate determined by the adjustment of the flapper valve F, and so as to maintain the air pressure in the chamber G' required for the operative functions of the device G.

The pressure chamber G' of the unit or device G, has a movable wall, formed by a bellows element $G^2$ within the cup shaped body of the unit. The element $G^2$ is connected at one end to the annular head $G^{30}$ attached to the rim of said cup shaped body. The other end of the bellows $G^2$ is closed by an end wall $G^3$, which is movable. A rod or stem $G^4$ within, and extending longitudinally of the bellows, has one end secured to the movable bellows end wall $G^3$, and is pivotally connected at its other end by a pivot GL to a crank arm L' carried by, and turning with a crank shaft L. The latter extends transversely to the bellows axis, and is journalled on the end member $G^{30}$. Fixed to the crank shaft L is a second crank arm $L^2$ carrying a pin $L^3$ engaging an edge portion $E^2$ of the lever E. To permit angular adjustment about the axis of the rock shaft L of the pin $L^3$ relative to the pivot GL, the pivot GL directly connects the stem $G^4$ to an arm $L^4$, which is loosely journalled on the shaft L and is angularly adjustable relative to the arm L', to which it is normally clamped by means including clamping and adjusting screws $L^5$.

The lever E is biased for movement in the clockwise direction, by a spring $E^3$, so that the edge $E^2$ of the lever is maintained constantly in engagement with the pin $L^3$. The flapper valve F is pivoted at F'', and is spring biased for movement in the clockwise direction toward the end of the nozzle $g$, so that, left to itself, the flapper valve F tends to close the nozzle $g$, and thereby increase the pressure in the chamber G'. The flapper valve F is adjusted toward and away from the nozzle $g$, by a pin or projection D' from the lever D. The pin D' may be moved to adjust the valve F either by an angular movement of the lever D, or angular adjustments of the lever E effected through the pin $L^3$ by the contraction and expansion of the bellows $G^2$, resulting from an increase or decrease of the pressure in the chamber G'.

The net operating effect of the described mechanism for adjusting the flapper valve F, is to vary the pressure in the chamber G' as required to make the angular position of the crank shaft L dependent in a predetermined manner on the axial adjustment position of the armature $b$ relative to the coils B and B'. On an increase in the fluid flow measured, which, with the arrangement shown, produces an upward movement of the armature $b$, the direct effect of the armature movement is to give counter-clockwise adjustments to the levers C and D. The resultant counter-clockwise movement of the pin D' permits a movement of the flapper valve F toward the nozzle $g$, whereby the pressure in the chamber G' is increased. That increase of pressure moves the bellows end $G^3$ to the right, and, through the stem $G^4$ and pivot pin GL, gives a counter-clockwise adjustment to the rock shaft L, whereby the pin $L^3$ acting on the lever E gives a counter-clockwise adjustment to the latter. The resultant bodily movement to the right of the lever D, causes the flapper valve to move away from the nozzle G, as required for the maintenance of a pressure in the chamber G' just sufficient to prevent further movement in either direction of the bellows end $G^3$ and stem $G^4$.

Conversely, on a decrease in the rate of flow measured, and a corresponding down movement of the armature $b$, the resultant clockwise adjustment of the lever D, moves the flapper valve F away from the nozzle $g$, and reduces the pressure in the chamber G'. This results in a movement of the bellows end $G^3$ and stem $G^4$ to the left. Those movements are terminated as soon as the resultant clockwise adjustments of the rock shaft L, pin $L^3$, and lever E, permits a closing movement of the flapper valve F into the position required for the maintenance of the pressure in the chamber G' necessary to arrest the expansion of the bellows $G^2$.

While the pressure in the chamber $G^1$ must be varied to give the bellows $G^2$ expansion and contraction movements, the pressure in the chamber G' required to hold the bellows end $G^3$ stationary, need not increase or decrease as the bellows length is varied, except as said pressure is varied to compensate for the tendency of the bellows to assume a particular length in consequence of the bellows wall resiliency. In practice, the bellows resiliency force involved is small in comparison with the effect of atmospheric pressure acting on the inner wall of the bellows which is open at its right hand end, and the pressure in the chamber G' need not rise at any time much above atmospheric pressure. In consequence, the duty of the air compressor is quite small, and the compressor driving load on the motor H is correspondingly small.

To properly relate the positions and relative movements of the bell crank lever D and armature $b$, the lever C comprises in addition to the arm to which the stem $b'$ is directly pivoted, a second arm $C^2$, also journalled on the pivot pin C' and adjustably clamped to the first mentioned arm by a clamping screw $C^3$. An adjusting screw mounted in the part $C^2$ and having an eccentric head projection $C^4$ received in a slot in the first mentioned arm of the lever C, serves by its rotation, when the clamping screw $C^3$ is released, to angularly adjust the arm $C^2$ relative to the lever part to which the stem $b'$ is directly connected. The lever part $C^2$ is formed with a slot $C^5$ curved about the axis of the pivotal connection between the lever D and link CD. The slot $C^5$ receives a clamping screw $C^6$ by which a part $C^7$, adjustable along the slot $C^5$, may be clamped to the lever part $C^2$. The lower end of the link CD is pivotally connected to the part $C^7$. The lever C carries an adjustable counterweight $C^8$, by which the lever with its connections is gravitationally balanced.

The pen arm H which records the rate of flow on the record disc $h$ is turned about the axis of a pivot H' by an arm $H^2$ rigidly connected to the pen arm and connected by a link $H^3$ to the crank arm $L^2$. As shown, the connection between the link $H^3$ and crank arm $L^2$ is made adjustable to vary the leverage with which the crank arm acts on the pen arm. The adjustment provisions comprise a part $L^7$ adjustably secured to the arm $L^2$ by a clamping screw $L^8$ passing through an elongated slot in the arm $L^2$. The lower end of the link $H^3$ is pivoted to the part $L^7$.

In various instruments in which the present invention may be used with advantage, the movements of the movable measuring member are not in linear proportion to the changes in value of the quantity measured. Thus, in the flow meter illustrated and described, the movements of the receiver core $b$ are proportional to the square root of the rate of flow measured. In general, it is preferable, and in some cases highly desirable from the practical standpoint, that the exhibiting element of the instrument, whether it be a recording pen or an indicating pointer, should move in linear proportion to the changes in the quantity measured. Such linear movement of the pen arm H of the instrument illustrated, is readily obtained by suitably shaping the edge $E^2$ of the lever E engaged by the pin $L^3$.

It is desirable that the pressure in chamber G' is not permitted to fall below the value necessary to maintain the pen at zero or above the value necessary to maintain the pan at full scale notwithstanding deflection of lever C below its position corresponding to zero position of pen H or above its position corresponding to full scale position of pen H. To this end the upper and lower ends of the surface $E^2$ of lever E are shaped as shown. As member $L^2$ is deflected clockwise beyond the point at which pen H coincides with its zero scale position as a result of a decrease in pressure in chamber G', member E will be permitted to move clockwise to neutralize said pressure and maintain the pen substantially at zero. As member $L^2$ is deflected counterclockwise beyond the point at which pen H coincides with its full scale position, member E will be turned counterclockwise to minimize such movement.

Figure 2:
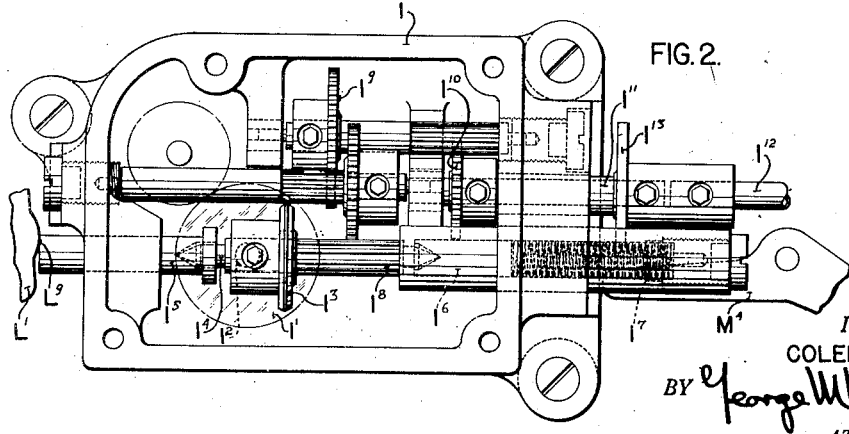
Fig. 2 is an elevation of a portion of the instrument integrating mechanism, shown in smaller scale in Fig. 1.

The previously mentioned integrating mechanism I includes as its driving element, a gear wheel I' rotated about the axis of its supporting shaft $I^2$ by suitable speed reducing gearing JI, shown diagrammatically in Fig. 1. The constant low speed rotative movement of the gear wheel I' gives a variable rotative movement to a wheel $I^3$ carried by a spindle $I^4$ the axis of which is transverse to, and intersects the axis of the gear wheel I'. The wheel $I^3$ is in frictional engagement at its periphery with one side or face of the gear wheel I', at a radial distance from the axis of the latter which is varied by axial adjustment of the spindle $I^4$ carrying the wheel $I^3$. Such axial adjustment is provided for by journalling the ends of the spindle $I^4$ in aligned plungers $I^5$ and $I^6$, axially movable in the supporting frame portion of the integrating mechanism I. A spring $I^7$ mounted in said frame work, urges the plunger $I^6$, and also the spindle $I^4$ and plunger $I^5$, to the left, as seen in Figs. 1 and 2, and thereby holds the end of the plunger $I^5$ against an edge $L^9$ of the crank arm L' carried by the shaft L. The edge $L^9$ is so shaped that as the shaft L is angularly adjusted, the axial movements imparted through the plunger $I^5$ to the spindle $I^4$, will be in linear proportion to the changes in the quantity measured, which produce the angular adjustment of the shaft L.

The parts are so proportioned that in the zero flow condition of the instrument, the wheel $I^3$ will engage the end of shaft $I^4$ at the center of the wheel I', so that the rotation of the wheel I' will not then rotate the wheel $I^3$. With any particular value of the flow except its zero value, however, the wheel $I^3$ will engage the wheel I' at a radial distance from the axis of the latter, which is a linear measure of the then existing rate of flow, and the extent of rotative movement of the wheel $I^3$, and its spindle $I^4$, per unit of time, will then be proportioned to the existing rate of flow.

The spindle $I^4$ is formed with a spur gear section $I^8$, sufficiently elongated to mesh, in all axial positions of said spindle, with the corresponding member of a train of speed reducing gears $I^9$, through which the rotation of the gear $I^8$ gives rotative movement to a gear $I^{10}$ carried by a spindle $I^{11}$. The latter is connected by a flexible shaft $I^{12}$ to a counting train $i$, which is thus adapted to exhibit the integrated value of the flow.

Figure 5:
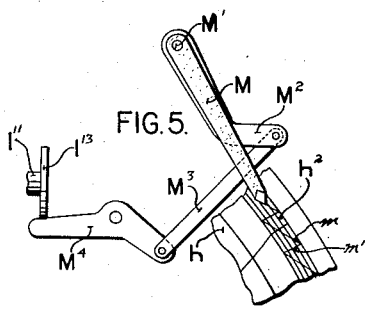
Fig. 5 is a front elevation of a portion of the instrument on a larger scale than Fig. 1.
Figure 4:
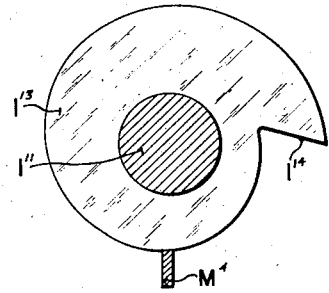
Fig. 4 is an elevation of a cam element.

In an instrument of the type illustrated, it is convenient, in many cases, to provide a record on the record chart $h$ of the integrated values of the quantity measured during different periods throughout the periods in which any particular record chart $h$ is in use, such as might be obtained by moving a planimeter along the record curve traced on the chart by the pen arm H. In the instrument shown, a record of the integrated value of the flow, is made on the chart disc $h$ adjacent its periphery, as shown in Fig. 5, by a pen arm M pivoted at M' and connected by a crank arm $M^2$ and link $M^3$ to a lever $M^4$, which is operatively engaged by the edge of a cam $I^{13}$ carried by the spindle $I^{11}$. The cam $I^{13}$ (Fig. 4) is shown as having a spiral edge with its minimum and maximum radii portions connected by a radial shoulder $I^{14}$. In consequence, the record formed by the pen arm M, will consist of a plurality of inclined portions $m$, each connected to each adjacent portion by a transverse portion $m'$. The angular displacement between adjacent transverse curve portions $m'$ will correspond to the time interval required for the chart movement during which the integrated value of the flow is that represented by a single revolution of the spindle $I^{11}$. Each curve portion is a short arc, the radius of curvature of which is equal to the length of the pen arm, and each inclined portion $m$ will approximate or depart from a straight line, accordingly, as the rate of flow is approximately constant or varies during the period in which said inclined portion is formed.

As is well known to those skilled in the art, instruments in which the movable measuring member is the core of an induction bridge receiver element, are not restricted to use in measuring rates of flow, but is well adapted for use where the core of the transmitter element of the bridge is moved by changes in temperature or pressure or of other physical quantities or conditions. Moreover, as will be apparent to those skilled in the art, the general features of the present invention are adapted for use in instruments in which the movable measuring member is not the core of an inductance bridge receiver element, but is a member deflected by any measuring force large enough to actuate a flapper valve, such as the valve F, but is not large enough to adjust a recording pen, or an integrating mechanism or to perform some other measuring or control function desirably effected by the instrument in response to the deflection of a sensitive measuring member, and readily effected with the force which may be readily exerted by the bellows unit G illustrated, or by some equivalent fluid pressure device, which may be controlled by a flapper valve in the general manner in which the device G is controlled by the flapper valve F.

In any instrument comprising a pneumatic power device or relay mechanism for adjusting some instrument device or mechanism in accordance with the movements of a sensitive movable measuring element, there are certain general advantages in placing the compressor, supplying air under pressure for the actuation of the power device or relay mechanism, in the instrument casing, so that the air compressed and used may be continuously held within the casing, and hence does not require filtering or give rise to difficulties as a result of the condensation of water vapor mixed with the air, or as a result of pressure drop and time lag due to the flow of the pressure air through elongated piping supplying air to the instrument from an external source of compressed air. The conception of an arrangement of the compressor within an instrument casing to obtain the general advantages just mentioned did not originate with me, but with Roy Ullman, and is disclosed in his application, Serial No. 82,859, filed of even date herewith. In combining an air compressor within the instrument casing with the particular type of pneumatic relay mechanism disclosed and claimed herein, I obtain a special advantage, however, from the relatively very small volume of compressed air and the relatively low pressure to which it needs to be compressed for the operation of said mechanism.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination in an instrument for measuring a variable quantity, of a controlling member adapted to move in one direction and in the reverse direction, in accordance with changes in said quantity, and fluid pressure mechanism comprising a pressure chamber, a controlled member adapted to move, independently of the movements of the first mentioned member, in one direction and in the reverse direction, as the pressure in said chamber is increased and decreased, respectively, an exhibiting element actuated by said controlled member to exhibit the varying value of said variable quantity and a valve adapted by its opening and closing adjustments to control the pressure in said chamber, and valve operating means, through which movement of each of said members in one direction or in the reverse direction without a corresponding movement of the other member, gives an opening or closing adjustment, respectively, to said valve, whereby changes in position of the controlling member produce definitely related changes in position of the controlled member.

2. An instrument as specified in claim 1, in which the valve operating means include a lever angularly adjusted by movements of the controlled member, and a second lever pivotally mounted on the first mentioned lever and angularly adjusted by said controlling member and adapted to adjust said valve by its own angular adjustments and as a result of the angular adjustments of the first mentioned lever.

3. An instrument as specified in claim 1, in which the valve operating means comprises a device directly oscillated by the movements of said control member, a lever engaging said device and oscillated by the oscillation of the latter, and a second lever pivoted on the first mentioned lever and oscillated by the movements of the controlling member and adapted to actuate said valve when oscillated by the controlling member, and also as a result of the oscillation of the first mentioned lever.

4. An instrument as specified in claim 1, in which the valve operating means includes a lever, cam means through which said lever is oscillated by movements of said controlled member, a second lever pivoted on the first mentioned lever and oscillated by the movements of the controlling member and adapted to adjust said valve when oscillated and also as a result of the oscillations of the first mentioned lever, whereby the relation of the movement of the controlled member to the movement of the controlling member depends upon the form of said cam means.

5. The combination in an instrument for recording the value of a variable quantity, of a controlling member deflecting in one direction or in the reverse direction as said quantity changes, fluid pressure mechanism comprising a pressure chamber, a controlled member adapted to move in one direction or in the reverse direction as the pressure in said chamber is increased and decreased, respectively, and an adjustable valve adapted by its opening and closing adjustments to control the pressure in said chamber, valve operating means through which movement of each of said members in one direction or in the reverse direction gives an opening or closing adjustment, respectively, to said valve, an adjustable recording pen, and means through which the movements of said controlled member adjust said pen.

6. The combination in an instrument for integrating the value of a variable quantity, of a controlling member deflecting in one direction or in the reverse direction as said quantity changes, fluid pressure mechanism comprising a pressure chamber, a controlled member adapted to move in one direction or in the reverse direction as the pressure in said chamber is increased and decreased, respectively, and an adjustable valve adapted by its opening and closing adjustments to control the pressure in said chamber, valve operating means through which movement of each of said members in one direction or in the reverse direction gives an opening or closing adjustment respectively, to said valve, an integrating mechanism including a rotatable driving element rotating at a constant rate, and an adjustable rotatable driven element rotated by the driving element at a rate dependent on the adjustment of the driven element, and means through which the movements of said controlled member adjusts said driven element.

7. An instrument as specified in claim 1, comprising an instrument casing enclosing the combination specified in claim 1, and a motor driven air compressor also enclosed in said casing and adapted to compress air drawn from the air space within said casing for the actuation of the said fluid pressure mechanism, the latter returning the air to said casing space.

8. The combination in an instrument for recording the value of a variable quantity, of a controlling member deflecting in one direction or in the reverse direction as said quantity changes, fluid pressure mechanism comprising a pressure chamber, a controlled member adapted to move in one direction or in the reverse direction as the pressure in said chamber is increased and decreased, respectively, and an adjustable valve adapted by its opening and closing adjustments to control the pressure in said chamber, valve operating means through which movement of said controlling member in one direction or in the reverse direction gives an opening or closing adjustment, respectively, to said valve, independently of the pressure in said chamber, and through which a change in pressure in said chamber resulting from said opening or closing adjustment of said valve effects a closing or opening adjustment respectively, of said valve, an adjustable exhibiting element to indicate the value of said quantity and means through which the movements of said controlled member adjust said element.

9. The combination in an instrument for recording the value of a variable quantity, of a controlling member deflecting in one direction or in the reverse direction as said quantity changes, fluid pressure mechanism comprising a pressure chamber, a controlled member adapted to move in one direction or in the reverse direction as the pressure in said chamber is increased and decreased, respectively, and an adjustable valve adapted by its opening and closing adjustments to control the pressure in said chamber, valve operating means including a floating lever attached to said controlling member at a point and through which movement of the latter in one direction or in the reverse direction gives an opening or closing adjustment, respectively, to said valve, independently of the pressure in said chamber, and through which a change in pressure in said chamber resulting from said opening or closing adjustment of said valve effects adjustment of said lever at a point removed from said first mentioned point and in a reverse sense to thereby respectively close or open said valve, an adjustable exhibiting element to indicate the value of said quantity and means through which the movements of said controlled member adjust said element.

COLEMAN B. MOORE.